US010598245B2

United States Patent
Sohn et al.

(10) Patent No.: US 10,598,245 B2
(45) Date of Patent: Mar. 24, 2020

(54) DYNAMIC DAMPER FOR VEHICLE

(71) Applicant: DAEHEUNG RUBBER & TECHNOLOGY CO., LTD., Gimhae-si, Gyeongsangnam-do (KR)

(72) Inventors: Hyun Chul Sohn, Gimhae-si (KR); Shin Won Lee, Gimhae-si (KR); Seong-Hoo Park, Gimhae-si (KR)

(73) Assignee: DAEHEUNG RUBBER & TECHNOLOGY CO., LTD., Gimhae-si, Gyeongsangnam-do (KR)

( * ) Notice: Subject to any disclaimer, the term of this patent is extended or adjusted under 35 U.S.C. 154(b) by 47 days.

(21) Appl. No.: 16/039,339

(22) Filed: Jul. 19, 2018

(65) Prior Publication Data

US 2019/0360549 A1 Nov. 28, 2019

(30) Foreign Application Priority Data

May 28, 2018 (KR) .......................... 10-2018-0060080

(51) Int. Cl.
 *F16F 7/108* (2006.01)
(52) U.S. Cl.
 CPC .......... *F16F 7/108* (2013.01); *F16F 2222/08* (2013.01); *F16F 2230/0005* (2013.01); *F16F 2234/02* (2013.01)
(58) Field of Classification Search
 CPC .. F16F 7/108; F16F 2222/08; F16F 2230/005; F16F 2234/02
 USPC .................................................. 188/349, 380
 See application file for complete search history.

(56) References Cited

U.S. PATENT DOCUMENTS

| 3,486,585 | A | * | 12/1969 | Hasz | F16F 7/108 |
| | | | | | 188/379 |
| 5,135,204 | A | * | 8/1992 | Funahashi | F16F 15/1442 |
| | | | | | 188/379 |
| 5,353,919 | A | * | 10/1994 | Buchner | F27B 9/2407 |
| | | | | | 193/37 |
| 6,308,810 | B1 | | 10/2001 | Kuwayama | |
| 9,297,435 | B2 | * | 3/2016 | Cerri | F16F 7/108 |

(Continued)

FOREIGN PATENT DOCUMENTS

| DE | 10327711 A1 * | 1/2005 | ............. B60N 2/50 |
| EP | 0347545 A1 * | 12/1989 | ............. B60R 16/04 |

(Continued)

OTHER PUBLICATIONS

Dialog translation, JP 11 325169 A, Nov. 1999. (Year: 1999).*

*Primary Examiner* — Thomas J Williams
(74) *Attorney, Agent, or Firm* — Revolution IP, PLLC (57) ABSTRACT

A dynamic damper for a vehicle, includes: a mass; a first bolt including a first bolt head and a first bolt body; a first elastic portion having one portion flexibly bonded to the first bolt head of the first bolt and the other portion flexibly bonded to the mass; a second bolt including a second bolt head and a second bolt body; a second elastic portion having one portion flexibly bonded to the second bolt head of the second bolt and the other portion flexibly bonded to the mass; a first bracket including a first bolt-coupling plate; a first nut screw-engaged with the first bolt body of the first bolt; a second bracket comprising a second bolt-coupling plate extending in a top-bottom direction; and a second nut screw-engaged with the second bolt body of the second bolt to couple the second bolt to the second bolt-coupling plate.

2 Claims, 8 Drawing Sheets

(56) References Cited

U.S. PATENT DOCUMENTS

| | | | |
|---|---|---|---|
| 9,447,833 B2 | 9/2016 | Choi et al. | |
| 2004/0149531 A1* | 8/2004 | Durre | B60G 13/16 |
| | | | 188/379 |
| 2013/0118848 A1* | 5/2013 | Mischler | B23Q 11/0035 |
| | | | 188/379 |
| 2016/0169314 A1 | 6/2016 | Choi et al. | |
| 2017/0167568 A1 | 6/2017 | Cho | |
| 2017/0268601 A1 | 9/2017 | Kim | |
| 2018/0274619 A1* | 9/2018 | Gebhardt | F16F 7/108 |
| 2019/0186577 A1* | 6/2019 | Back | F16F 7/108 |
| 2019/0383344 A1* | 12/2019 | Roeda | F16F 1/3814 |
| 2020/0018372 A1* | 1/2020 | Reusswig | F16F 7/108 |

FOREIGN PATENT DOCUMENTS

| | | | | |
|---|---|---|---|---|
| EP | 0627572 A1 | * | 12/1994 | F16F 7/108 |
| EP | 3467334 A1 | * | 4/2019 | F16F 1/3732 |
| GB | 2438862 A | * | 12/2007 | B65D 81/107 |
| JP | 03288040 A | * | 12/1991 | |
| JP | 11325169 A | * | 11/1999 | F16F 7/108 |
| KR | 10-1648427 A | | 6/2016 | |

* cited by examiner

DYNAMIC DAMPER FOR VEHICLE

CROSS REFERENCE TO RELATED APPLICATION

The present application claims priority to Korean Patent Application No. 10-2018-0060080, filed May 28, 2018, the entire contents of which is incorporated herein for all purposes by this reference.

BACKGROUND OF THE PRESENT INVENTION

Field of the Present Invention

The present invention relates generally to a dynamic damper for a vehicle and, more particularly, to a dynamic damper for a vehicle, the dynamic damper being mounted on a sub-frame, a lift gate, or the like of a vehicle.

Description of the Related Art

During travel of a vehicle, vibration and noise are generated by a variety of components, such as an engine, a power transmission, and a muffler unit. A dynamic damper is provided as means for preventing or reducing generation of vibration.

Such dynamic dampers for vehicles are provided in vehicles to reduce vibration in a specific frequency range.

Figure 1:
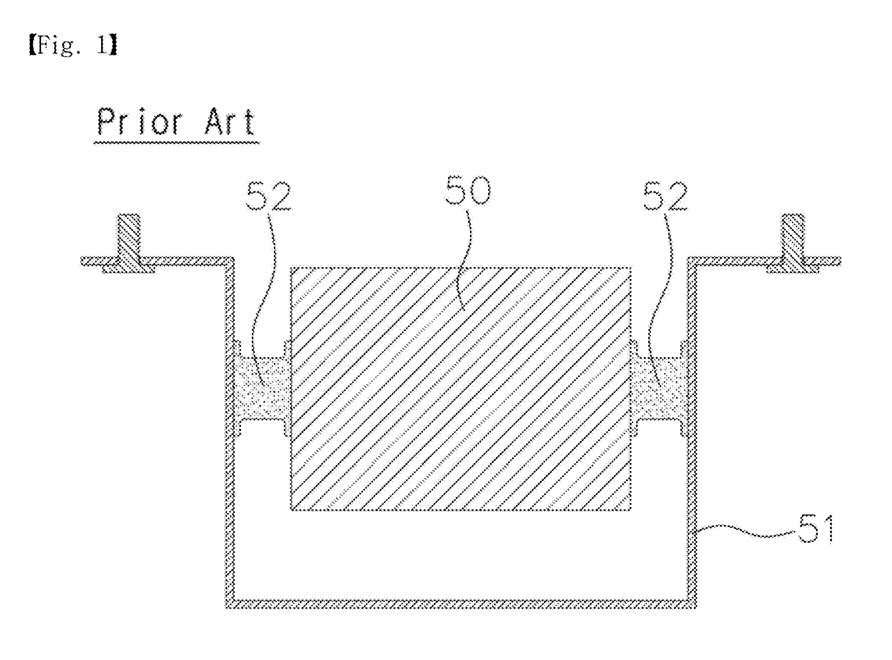
FIG. 1 a cross-sectional view illustrating a dynamic damper for a vehicle according to the related art.

As illustrated in FIG. 1, a dynamic damper of the related art may generally be provided as a unitary body, including a mass 50 having a predetermined amount of weight, a bracket 51 a mounted on a vibration-generating portion (not shown), and elastic members 52 flexibly bonded between the mass 50 and the bracket 51, the elastic members 52 being made of rubber and having dynamic modulus.

However, in the dynamic damper having the above-described structure according to the related art, it is impossible to control the displacement of the mass 50, and the mass 50 may be dislodged from the sub-frame 51 when the elastic members 52 crack or the bonding of the elastic members 52 is defective. Due to such problems, in the dynamic damper of the related art, the ability to increase the weight of the mass 50 is limited. Accordingly, it is impossible to increase the damping effect, which is problematic.

In addition, in the dynamic damper of the related art, in the case of flexible bonding of the elastic members 52, the bracket 51 must be previously mounted on an apparatus for flexibly bonding the elastic members 52. Accordingly, the size of the apparatus for flexibly bonding the elastic members 52 is inevitably increased, which is problematic.

The foregoing is intended merely to aid in the understanding of the background of the present invention, and is not intended to mean that the present invention falls within the purview of the related art that is already known to those skilled in the art.

Documents of Related Art (Patent Document 1) Korean Patent No. 10-1648427 "DYNAMIC DAMPER" (Aug. 9, 2016)

SUMMARY OF THE PRESENT INVENTION

Accordingly, the present invention has been made keeping in mind the above problems occurring in the related art, and the present invention is intended to propose a dynamic damper for a vehicle in which the weight of a mass can be increased to improve a damping effect, and the mass can be prevented from being dislodged even in the case in which an elastic portion cracks or is subjected to debonding.

In order to achieve the above object, according to one aspect of the present invention, a dynamic damper for a vehicle may include: a mass including a cylindrical mass body; a first bolt including a first bolt head spaced apart from one longitudinal end portion of the mass and a first bolt body extending from the first bolt head in a direction away from the mass, the first bolt body having threads on a circumferential surface thereof; a first elastic portion having one portion flexibly bonded to the first bolt head of the first bolt and the other portion flexibly bonded to the mass; a second bolt including a second bolt head spaced apart from the other longitudinal end portion of the mass and a second bolt body extending from the second bolt head in a direction away from the mass, the second bolt body having threads on a circumferential surface thereof; a second elastic portion having one portion flexibly bonded to the second bolt head of the second bolt and the other portion flexibly bonded to the mass; a first bracket including a first bolt-coupling plate extending in a top-bottom direction, the first bolt-coupling plate having a first bolt through-hole, through which the first bolt body of the first bolt extends; a first nut screw-engaged with the first bolt body of the first bolt to couple the first bolt to the first bolt-coupling plate; a second bracket including a second bolt-coupling plate extending in a top-bottom direction, the second bolt-coupling plate having a second bolt through-hole, through which the second bolt body of the second bolt extends; and a second nut screw-engaged with the second bolt body of the second bolt to couple the second bolt to the second bolt-coupling plate. The mass includes a first mass stopper having a circular cross-sectional structure, a diameter of which is smaller than a diameter of the mass body, the first mass stopper protruding outward from one longitudinal end of the mass body, and a second mass stopper having a circular cross-sectional structure, a diameter of which is equal to diameter of the first mass stopper, the second mass stopper protruding outward from the other longitudinal end of the mass body. The first elastic portion is flexibly bonded to the first mass stopper of the mass. The second elastic portion is flexibly bonded to the second mass stopper of the mass. The first bracket includes a first stopper cylindrical member extending from the first bolt-coupling plate to the mass, wherein the first bolt head of the first bolt and the first mass stopper of the mass are accommodated within the first stopper cylindrical member. The second bracket includes a second stopper cylindrical member extending from the second bolt-coupling plate to the mass, wherein the second bolt head of the second bolt and the second mass stopper of the mass are accommodated within the second stopper cylindrical member.

The first bracket may include: a first coupling bracket including a first bolt-coupling plate and a first vibrator-mounting coupling plate bent horizontally from a bottom end of the first bolt-coupling plate to be coupled to a vibration-generating portion; and a first stopper bracket including the first stopper cylindrical member and a first base plate provided on the first stopper cylindrical member in a top-bottom direction to be bonded to the first bolt-coupling plate.

According to another aspect of the present invention, a dynamic damper for a vehicle may include: a mass including a cylindrical mass body; a first bolt including a first bolt head spaced apart from one longitudinal end portion of the mass and a first bolt body extending from the first bolt head in a direction away from the mass, the first bolt body having threads on a circumferential surface thereof; a first elastic portion having one portion flexibly bonded to the first bolt head of the first bolt and the other portion flexibly bonded to the mass; a second bolt including a second bolt head spaced apart from the other longitudinal end portion of the mass and a second bolt body extending from the second bolt head in a direction away from the mass, the second bolt body having threads on a circumferential surface thereof; a second elastic portion having one portion flexibly bonded to the second bolt head of the second bolt and the other portion flexibly bonded to the mass; a first bracket including a first bolt-coupling plate extending in a top-bottom direction, the first bolt-coupling plate having a first bolt through-hole, through which the first bolt body of the first bolt extends; a first nut screw-engaged with the first bolt body of the first bolt to couple the first bolt to the first bolt-coupling plate; a second bracket including a second bolt-coupling plate extending in a top-bottom direction, the second bolt-coupling plate having a second bolt through-hole, through which the second bolt body of the second bolt extends; and a second nut screw-engaged with the second bolt body of the second bolt to couple the second bolt to the second bolt-coupling plate. The mass body has a first elastic portion coupler recess in one longitudinal end thereof. The mass includes a first elastic portion coupler coupled to the first elastic portion coupler recess while being flexibly bonded to the first elastic portion. The first bolt head includes a first stopper bolt head to which the first elastic portion is flexibly bonded. A first cylindrical mass stopper having an annular cross-sectional structure extends longitudinally outward from one longitudinal end of the mass body, such that the first stopper bolt head of the first bolt is accommodated within the first cylindrical mass stopper. A second elastic portion coupler recess is provided in the other longitudinal end of the mass body. The mass includes a second elastic portion coupler coupled to the second elastic portion coupler recess while being flexibly coupled to the second elastic portion. The second bolt head includes a second stopper bolt head to which the second elastic portion is flexibly bonded. A second cylindrical mass stopper having an annular cross-sectional structure protrudes longitudinally outward from the other longitudinal end of the mass body, such that the second stopper bolt head of the second bolt is accommodated within the second cylindrical mass stopper.

According to the present invention, in the dynamic damper for a vehicle, the weight of the mass can be increased to improve a damping effect, and the mass can be prevented from being dislodged even in the case in which the elastic portion cracks or is subjected to debonding.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE PRESENT INVENTION

Exemplary embodiments of the present invention will be described in detail with reference to the accompanying drawings, so that those skilled in the art could easily put the present disclosure into practice. The present invention may be embodied in other forms without being limited to the following embodiments. In the following description, detailed descriptions of some portions will be omitted in the case in which they are not related to the subject matter of the present invention. Throughout this document, reference should be made to the drawings, in which the same reference numerals and symbols will be used to designate the same or like components.

It will be understood that the terms "comprise", "include", "have", and any variations thereof used herein are intended to cover non-exclusive inclusions unless explicitly described to the contrary.

Figure 2:
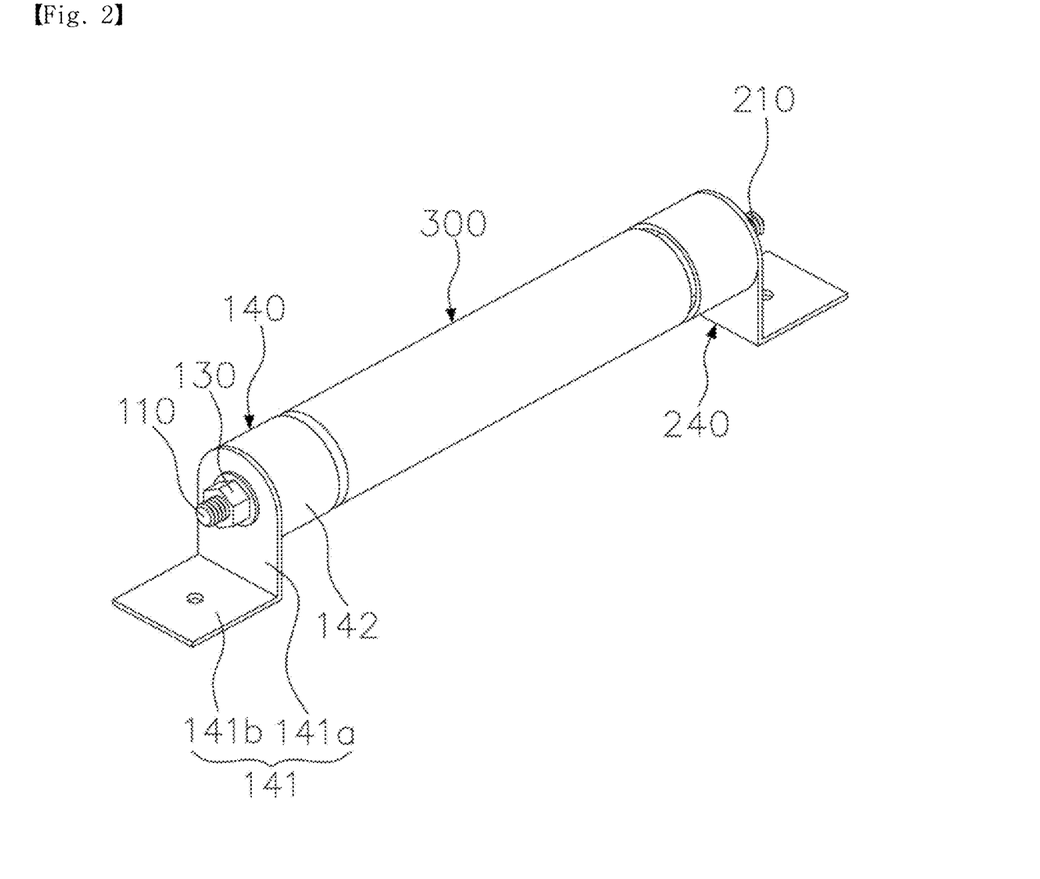
FIG. 2 is a perspective view illustrating a dynamic damper for a vehicle according to an exemplary embodiment of the present invention.
Figure 3:
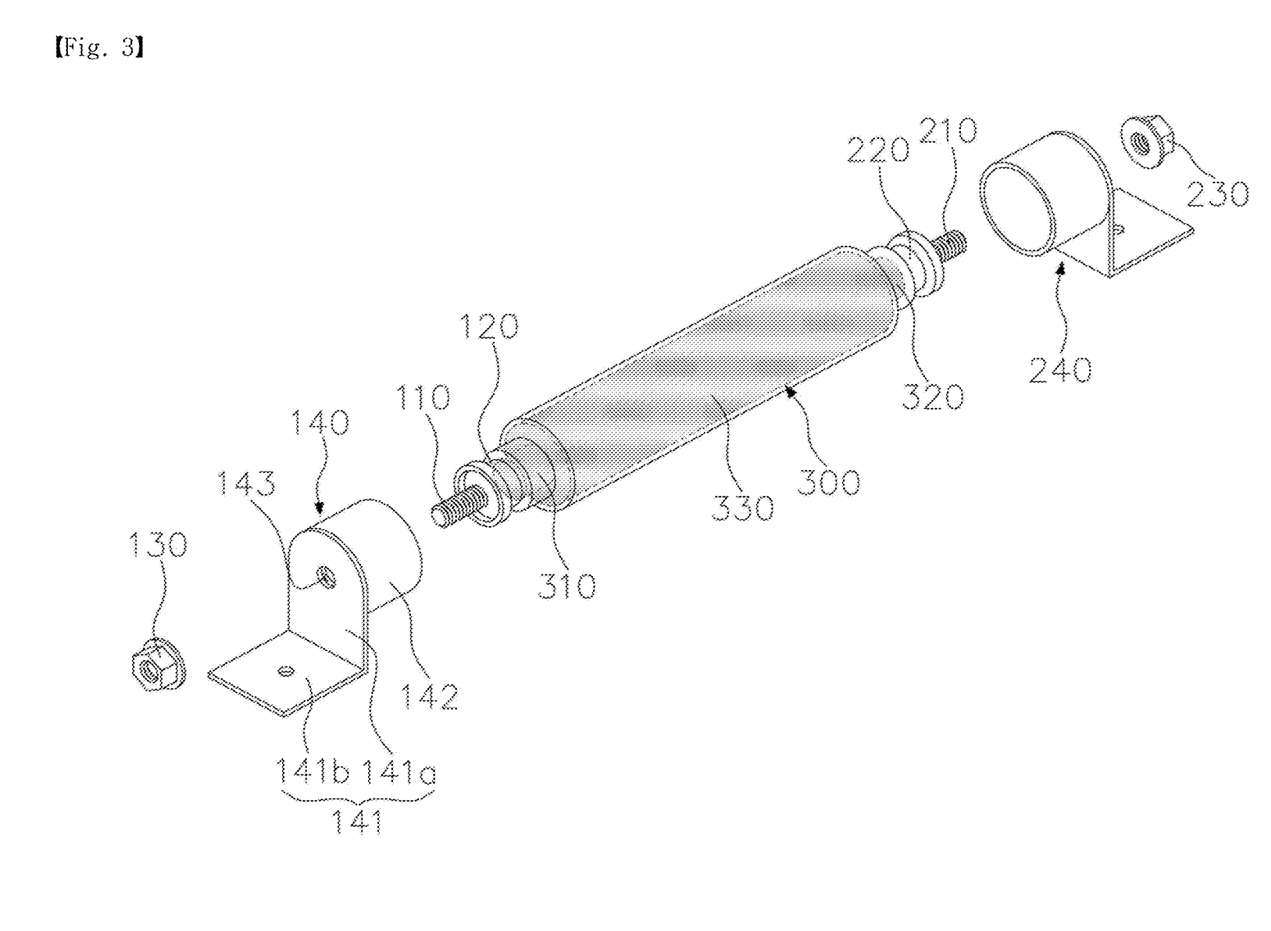
FIG. 3 is an exploded perspective view of the dynamic damper illustrated in FIG. 2.
Figure 4:
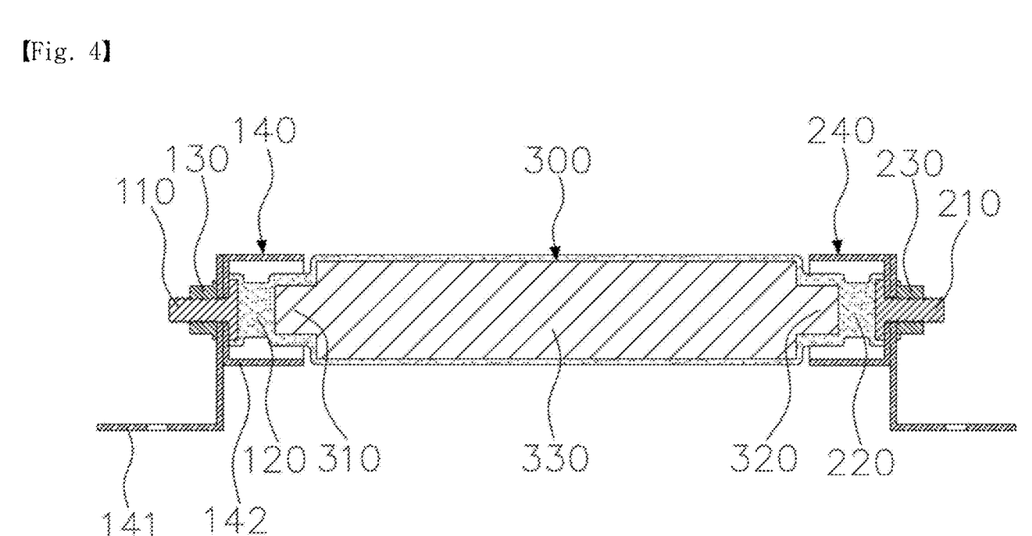
FIG. 4 is a cross-sectional view of the dynamic damper illustrated in FIG. 2.
Figure 5:
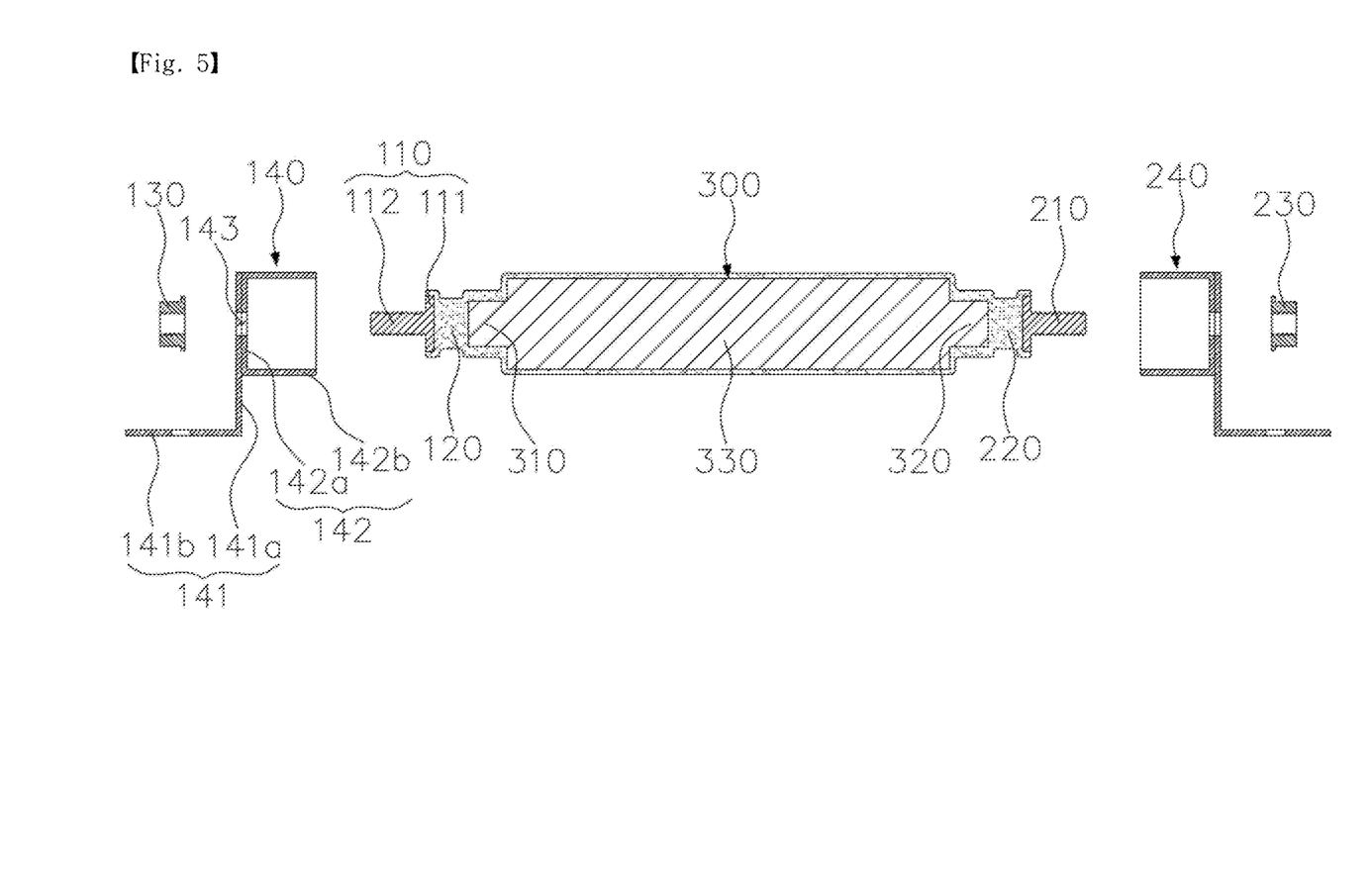
FIG. 5 is a cross-sectional view of the dynamic damper illustrated in FIG. 3.
Figure 6:
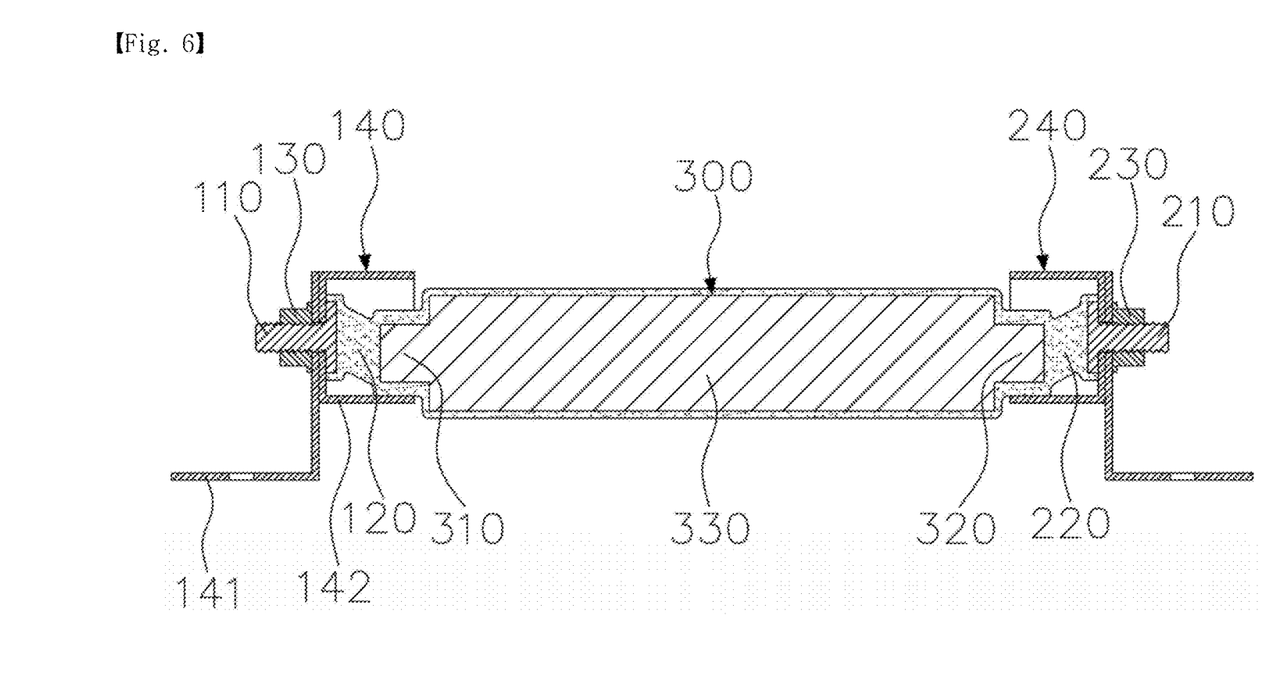
FIG. 6 is an operation diagram of the dynamic damper illustrated in FIG. 4.

FIG. 2 is a perspective view illustrating a dynamic damper for a vehicle according to an exemplary embodiment of the present invention, FIG. 3 is an exploded perspective view of the dynamic damper illustrated in FIG. 2, FIG. 4 is a cross-sectional view of the dynamic damper illustrated in FIG. 2, FIG. 5 is a cross-sectional view of the dynamic damper illustrated in FIG. 3, and FIG. 6 is an operation diagram of the dynamic damper illustrated in FIG. 4.

The dynamic damper according to the present exemplary embodiment is configured such that first and second bolts 110 and 210, first and second elastic portions 120 and 220, first and second nuts 130 and 230, and first and second brackets 140 and 240 are arranged around a mass 300.

The mass 300 according to the present exemplary embodiment includes a mass body 330 made of a metal and first and second mass stoppers 310 and 320 protruding from both ends of the mass body 330.

The mass body 330 has the shape of a cylinder, with a circular cross-sectional structure extending in the longitudinal direction thereof.

Each of the first and second mass stoppers 310 and 320 is configured such that a circular cross-sectional structure extends in the longitudinal direction. The diameter of each circular cross-sectional structure of the first and second mass stoppers 310 and 320 is smaller than the diameter of the circular cross-sectional structure of the mass body 330.

The circular cross-sectional structures of the first and second mass stoppers 310 and 320 have the same diameter.

The first mass stopper 310 protrudes outward from one longitudinal end of the mass body 330 in the longitudinal direction, while the second mass stopper 320 protrudes outward from the other longitudinal end of the mass body 330 in the longitudinal direction.

The first and second bolts 110 and 210 are connected to both longitudinal end portions of the mass body 330 via the first and second elastic portions 120 and 220.

The first bolt 110 includes a first bolt head 111 and a first bolt body 112.

The first bolt 110 is oriented such that the first bolt head 111 faces toward the mass 300 and the first bolt body 112 faces away from the mass 300.

In addition, the first bolt head 111 is spaced apart from the first mass stopper 310 in the longitudinal direction of the mass 300.

The first bolt body 112 extends from the first bolt head 111 in a direction away from the mass 300, and has threads on the circumferential surface thereof.

The first bolt 110 is connected to the mass 300 via the first elastic portion 120.

One portion of the first elastic portion 120 is flexibly bonded to the first bolt head 111 of the first bolt 110, while the other portion of the first elastic portion 120 is flexibly bonded to the first mass stopper 310.

The first bolt 110 and the first elastic portion 120 are disposed on one side of the mass 300, while the second bolt 210 and the second elastic portion 220 are provided on the other side of the mass 300.

Descriptions of the second bolt 210 and the second elastic portion 220 will be omitted, since structures thereof are the same as the structures of the first bolt 110 and the first elastic portion 120.

Although the first elastic portion 120 and the second elastic portion 220 have been separately described with respect to the flexibly-bonded portions in the present exemplary embodiment, the first elastic portion 120 and the second elastic portion 220 according to the present exemplary embodiment are portions of a single rubber member flexibly bonded to the first bolt 110 and the second bolt 210 while surrounding the entirety of the mass 300. It should be understood, however, that this configuration is only an embodiment.

As described above, the mass 300 and the first and second bolts 110 and 210 are fabricated as a single part (i.e. a damping member), connected by the first and second elastic portions 120 and 220.

The state in which the damping member is separated from the dynamic damper can be seen from FIG. 5.

Due to the structure in which the first and second bolts 110 and 210 are coupled to the mass 300, the damper member according to the present exemplary embodiment does not have a bracket connected thereto. Accordingly, the overall configuration of an apparatus for flexibly bonding the first and second elastic portions 120 and 220 can be designed to be compact.

The dynamic damper according to the present exemplary embodiment is completed by connecting the damping member to the first and second brackets 140 and 240 via the first and second nuts 130 and 230.

Hereinafter, a detailed structure of the first bracket 140 will be described.

The first bracket 140 includes a first coupling bracket 141 and a first stopper bracket 142.

The first coupling bracket 141 is a portion, which is mounted on the vibration-generating portion (not shown), and to which the damping member is coupled.

The first coupling bracket 141 includes a first bolt-coupling plate 141a extending in a top-bottom direction and a first vibrator-mounting coupling plate 141b bent perpendicularly from the bottom end of the first bolt-coupling plate 141a to be coupled to the vibration-generating portion.

The first stopper bracket 142 includes a first base plate 142a arranged in the top-bottom direction to be bonded to the first bolt-coupling plate 141a by welding or the like and a first stopper cylindrical member 142b extending from the first base plate 142a to the mass 300. Specifically, the first base plate 142a is a circular disk, and the first stopper cylindrical member 142b extends from the circumference of the first base plate 142a.

The first bolt-coupling plate 141a and the first base plate 142a, in close contact with each other, are provided with first bolt through-holes 143, through which the first bolt body 112 of the first bolt 110 extend. The first nut 130 is screw-engaged with the first bolt body 112 of the first bolt 110 extending from the first bolt through-holes 143, such that the first bolt 110 is coupled to the first bolt-coupling plate 141a and the first base plate 142a.

In addition, the first bolt head 111 of the first bolt 110, the first mass stopper 310 of the mass 300, and the first elastic portion 120 connecting the first bolt head 111 and the first mass stopper 310 are located within the first stopper cylindrical member 142b.

Details of the configurations of the second bracket 240 and the second nut 230 will be referred to as descriptions of the first bracket 140 and the first nut 130, and descriptions of the second bracket 240 and the second nut 230 will be omitted.

Although the first bracket 140 and the second bracket 240 have been described as being separated from each other in the present exemplary embodiment, some embodiments may provide a structure in which the first bracket 140 and the second bracket 240 are integrated with each other.

The operation of the above-described present exemplary embodiment will be described hereinafter.

As illustrated in FIG. 6, when the mass 300 vibrates, the maximum displacement of the mass 300 is limited by the first mass stopper 310 and the first stopper cylindrical member 142b. The limitation of the displacement is applied to the displacement of the mass 300 in all directions or over 360°.

Accordingly, the present invention can improve the level of safety by limiting the maximum displacement of the mass 300.

In addition, the present invention can improve a damping effect for a vehicle by increasing the weight of the mass 300.

In the related art as illustrated in FIG. 1, the mass weighing from about 300 g to about 500 g can only be used. In contrast, the mass 300 according to the present exemplary embodiment can weigh about 1,300 g, thereby significantly improving a damping effect for a vehicle.

Furthermore, the present invention can prevent the mass 300 from being dislodged even in the case in which cracks are formed or debonding occurs.

Hereinafter, a second embodiment of the present invention will be described.

Figure 7:
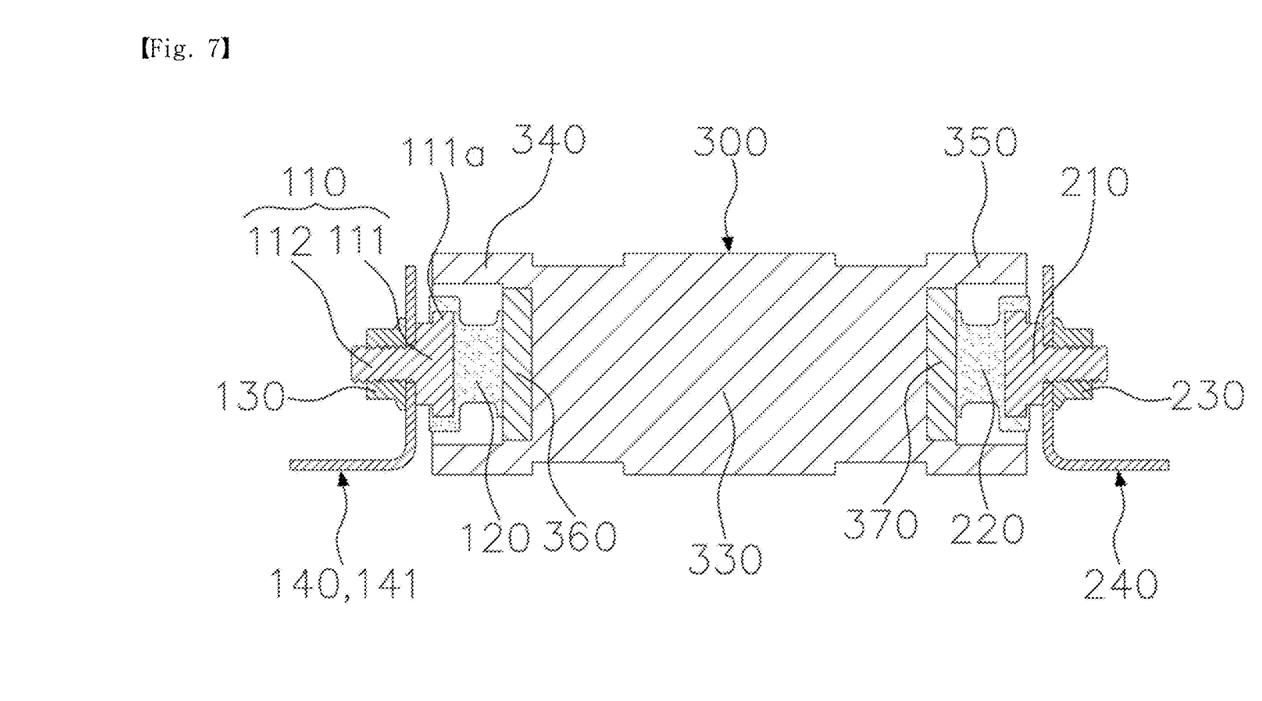
FIG. 7 is a cross-sectional view illustrating a dynamic damper for a vehicle according to a second embodiment of the present invention.
Figure 8:
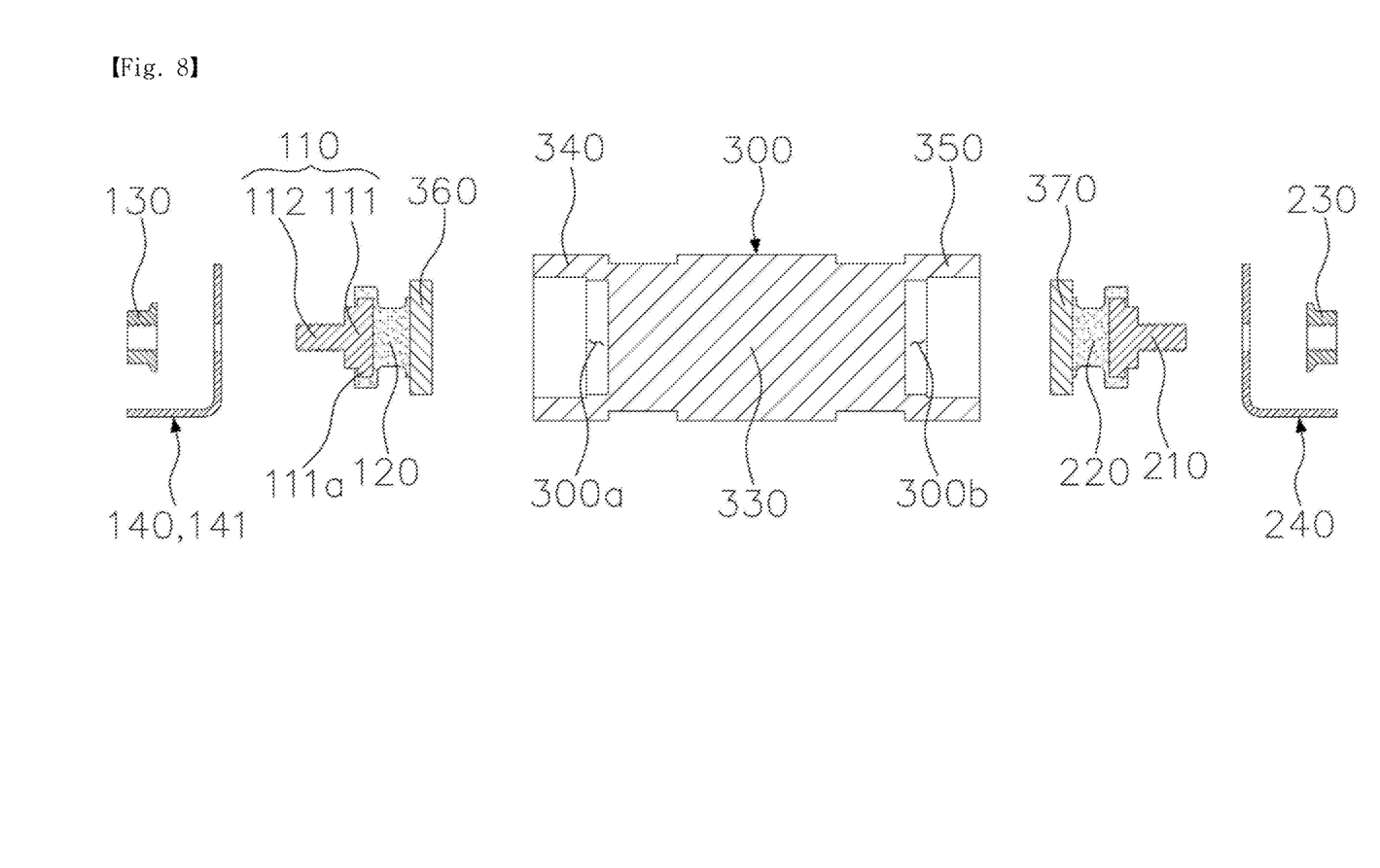
FIG. 8 is an exploded cross-sectional view of the dynamic damper illustrated in FIG. 7.

FIG. 7 is a cross-sectional view illustrating a dynamic damper for a vehicle according to a second embodiment of the present invention, and FIG. 8 is an exploded cross-sectional view of the dynamic damper illustrated in FIG. 7.

Hereinafter, characteristic features of the second embodiment distinct from the first embodiment will only be described. In the following, descriptions of some portions will be omitted when they are the same as those of the above-described first embodiment of the present invention.

According to the present exemplary embodiment, the first bolt head 111 of the first bolt 110 is provided a first stopper bolt head 111a.

The first stopper bolt head 111a is named considering the stopper function thereof. However, neither the shape nor position thereof is specifically limited.

Likewise, the second bolt 210 has a second stopper bolt head.

The mass 300 according to the present exemplary embodiment includes a mass body 330 made of a metal, a first cylindrical mass stopper 340 provided on the mass body 330, and a first elastic portion coupler 360. The first elastic portion coupler 360 is fabricated separately from the mass body 330 and then is coupled to the mass body 330 by press fitting or the like.

The mass body 330 has a first elastic portion coupler recess 300a in one longitudinal end thereof.

In addition, the mass body 330 is provided with the first cylindrical mass stopper 340 having an annular cross-sectional structure. The first cylindrical mass stopper 340 extends longitudinally outward from one longitudinal end of the mass body 330, such that the first stopper bolt head 111a of the first bolt 110 is accommodated within the first cylindrical mass stopper 340.

The first elastic portion coupler 360, flexibly bonded to the first elastic portion 120, is coupled to the first elastic portion coupler recess 300a of the mass body 330 by press fitting or the like.

In the present exemplary embodiment, first, the first elastic portion 120 is flexibly bonded to the first bolt 110 and the first elastic portion coupler 360. Afterwards, the first elastic portion coupler 360 is coupled to the mass body 330.

In the same manner as described above, a second stopper bolt head of the second bolt 210, a second elastic portion coupler recess 300b of the mass body, a second cylindrical mass stopper 350, a second elastic portion coupler 370, and the like are provided.

In the present exemplary embodiment as described above, the overall configuration of an apparatus for flexibly bonding the first and second elastic portions 120 and 220 can be designed to be very compact.

The first bracket 140 according to the present exemplary embodiment only includes the first coupling bracket 141.

The first coupling bracket 141 includes a first bolt-coupling plate extending in a top-bottom direction and a first vibrator-mounting coupling plate bent perpendicularly from the bottom end of the first bolt-coupling plate to be coupled to a vibration-generating portion.

The same configuration is applied to the second bracket 240.

In the present exemplary embodiment as described above, when the mass 300 vibrates, the maximum displacement of the mass 300 is limited by the first cylindrical mass stopper 340 and the first stopper bolt head 111a. The limitation of the displacement is applied to the displacement of the mass 300 in all directions or over 360°.

In addition, since the first stopper bolt head 111a is surrounded by the first elastic portion 120, the range of the displacement of the first cylindrical mass stopper 340 of the mass 300 is limited by the first stopper bolt head 111a via the first elastic portion 120.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing embodiments disclosed herein shall be interpreted as illustrative, while not being limitative, of the principle and scope of the present invention. For example, components which have been described as being portions of a single body may be provided as being distributed components. Likewise, components which have been described as being distributed may be provided as being combined to provide a single body.

It should be understood that the scope of the present invention shall be defined by the appended Claims and all of their equivalents fall within the scope of the present invention.

What is claimed is:

1. A dynamic damper for a vehicle, comprising:
a mass comprising a cylindrical mass body;
a first bolt comprising a first bolt head spaced apart from one longitudinal end portion of the mass and a first bolt body extending from the first bolt head in a direction away from the mass, the first bolt body having threads on a circumferential surface thereof;
a first elastic portion having one portion flexibly bonded to the first bolt head of the first bolt and the other portion flexibly bonded to the mass;
a second bolt comprising a second bolt head spaced apart from the other longitudinal end portion of the mass and a second bolt body extending from the second bolt head in a direction away from the mass, the second bolt body having threads on a circumferential surface thereof;
a second elastic portion having one portion flexibly bonded to the second bolt head of the second bolt and the other portion flexibly bonded to the mass;
a first bracket comprising a first bolt-coupling plate extending in a top-bottom direction, the first bolt-coupling plate having a first bolt through-hole, through which the first bolt body of the first bolt extends;
a first nut screw-engaged with the first bolt body of the first bolt to couple the first bolt to the first bolt-coupling plate;
a second bracket comprising a second bolt-coupling plate extending in a top-bottom direction, the second bolt-coupling plate having a second bolt through-hole, through which the second bolt body of the second bolt extends; and
a second nut screw-engaged with the second bolt body of the second bolt to couple the second bolt to the second bolt-coupling plate,
wherein the mass comprises a first mass stopper having a circular cross-sectional structure, a diameter of which is smaller than a diameter of the mass body, the first mass stopper protruding outward from one longitudinal end of the mass body, and a second mass stopper having a circular cross-sectional structure, a diameter of which is equal to diameter of the first mass stopper, the second mass stopper protruding outward from the other longitudinal end of the mass body,
the first elastic portion is flexibly bonded to the first mass stopper of the mass,
the second elastic portion is flexibly bonded to the second mass stopper of the mass,
the first bracket comprises a first stopper cylindrical member extending from the first bolt-coupling plate to the mass, wherein the first bolt head of the first bolt and the first mass stopper of the mass are accommodated within the first stopper cylindrical member, and
the second bracket comprises a second stopper cylindrical member extending from the second bolt-coupling plate to the mass, wherein the second bolt head of the second bolt and the second mass stopper of the mass are accommodated within the second stopper cylindrical member.

2. The dynamic damper according to claim 1, wherein the first bracket comprises:

a first coupling bracket comprising a first bolt-coupling plate and a first vibrator-mounting coupling plate bent horizontally from a bottom end of the first bolt-coupling plate to be coupled to a vibration-generating portion; and
a first stopper bracket comprising the first stopper cylindrical member and a first base plate provided on the first stopper cylindrical member in a top-bottom direction to be bonded to the first bolt-coupling plate.

* * * * *